(12) United States Patent
Hinami

(10) Patent No.: US 12,208,647 B2
(45) Date of Patent: Jan. 28, 2025

(54) TIRE FOR ROUGH TERRAIN

(71) Applicant: Sumitomo Rubber Industries, Ltd., Kobe (JP)

(72) Inventor: Yukiko Hinami, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 98 days.

(21) Appl. No.: 17/960,295

(22) Filed: Oct. 5, 2022

(65) Prior Publication Data

US 2023/0105894 A1 Apr. 6, 2023

(30) Foreign Application Priority Data

Oct. 6, 2021 (JP) .................................. 2021-164884

(51) Int. Cl.
*B60C 11/03* (2006.01)

(52) U.S. Cl.
CPC ... *B60C 11/0311* (2013.01); *B60C 2011/0313* (2013.01); *B60C 2200/10* (2013.01); *B60C 2200/14* (2013.01)

(58) Field of Classification Search
CPC ............ B60C 2200/10; B60C 2200/14; B60C 11/0311
See application file for complete search history.

(56) References Cited

U.S. PATENT DOCUMENTS

| 3,842,879 A | * | 10/1974 | Mills ....................... B60C 11/00 |
| | | | 152/902 |
| 2012/0024440 A1 | * | 2/2012 | Ishida ..................... B60C 11/11 |
| | | | 152/209.1 |
| 2012/0048436 A1 | * | 3/2012 | Matsumura ......... B60C 11/0302 |
| | | | 152/209.1 |

FOREIGN PATENT DOCUMENTS

| EP | 3 909 788 A1 | 11/2021 |
| EP | 3 967 522 A1 | 3/2022 |
| EP | 4 091 843 A1 | 11/2022 |
| JP | 2015134578 A | * 7/2015 |
| JP | 2020111262 A | * 7/2020 |
| JP | 2021-84554 A | 6/2021 |

OTHER PUBLICATIONS

Extended European Search Report for European Application No. 22197209.4, dated Feb. 2, 2023.

* cited by examiner

*Primary Examiner* — Cedrick S Williams
(74) *Attorney, Agent, or Firm* — Birch, Stewart, Kolasch & Birch, LLP

(57) ABSTRACT

A tire for running on rough terrain for which an intended tire rotational direction is specified, and which comprises a tread portion provided with crown blocks disposed on the tire equator. Each of the crown blocks comprises a V-shaped crown block main portion which bends convexly toward a circumferential direction opposite to the intended tire rotation direction, and only two crown fin portions projecting from the crown block main portion toward the above-said circumferential direction opposite to the intended tire rotation direction.

18 Claims, 9 Drawing Sheets

TIRE FOR ROUGH TERRAIN

TECHNICAL FIELD

The present disclosure relates to a tire for rough terrain.

BACKGROUND ART

The following Patent Document 1 discloses a tire for running on rough terrain in which the tread portion is provided with crown blocks.
The crown block comprises a crown block main portion, and three crown fin portions protruding in the tire circumferential direction from the crown block main portion.
Such crown fin portions are explained as being useful for enhancing traction performance.

Patent Document 1: Japanese Patent Application Publication No. 2021-084554

SUMMARY OF THE INVENTION

Problems to be Solved by the Invention

When traveling on muddy ground or road with the above-mentioned tire, the mud tends to be clogged between the crown fin portions, and the clogged mud is difficult to be ejected, therefore, the traction tends to decrease.
The present disclosure was made in view of the above circumstances, and a primary object of the present disclosure is to provide a tire for running on rough terrain which is improved in traction performance on rough terrain.

Means for Solving the Problems

According to the present disclosure, a tire for running on rough terrain for which an intended tire rotational direction is specified, comprises a tread portion provided with crown blocks disposed on the tire equator,
wherein
each of the crown blocks comprises
a V-shaped crown block main portion which bends convexly toward a circumferential direction opposite to the intended tire rotation direction, and
crown fin portions projecting from the crown block main portion toward the above-said circumferential direction opposite to the intended tire rotation direction, and
the number of the crown fin portions is two per one crown block.

Effects of the Invention

In the tire according to the present disclosure, therefore, the traction performance when traveling on rough terrain can be improved by the crown blocks having the above described configuration.

DETAILED DESCRIPTION OF THE INVENTION

Figure 1:
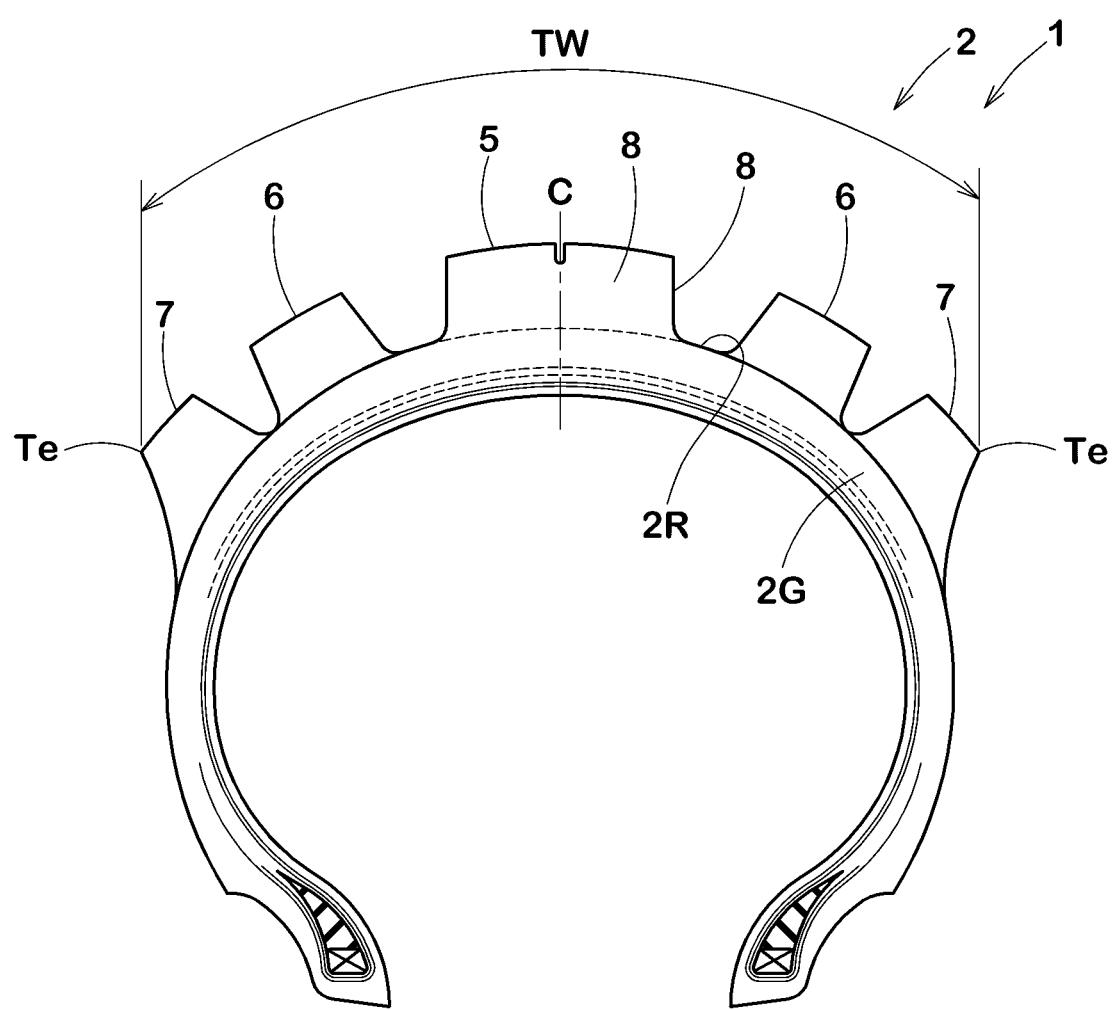
FIG. 1 is a tire meridian cross-sectional view of a tire as an embodiment of the present disclosure.
Figure 2:
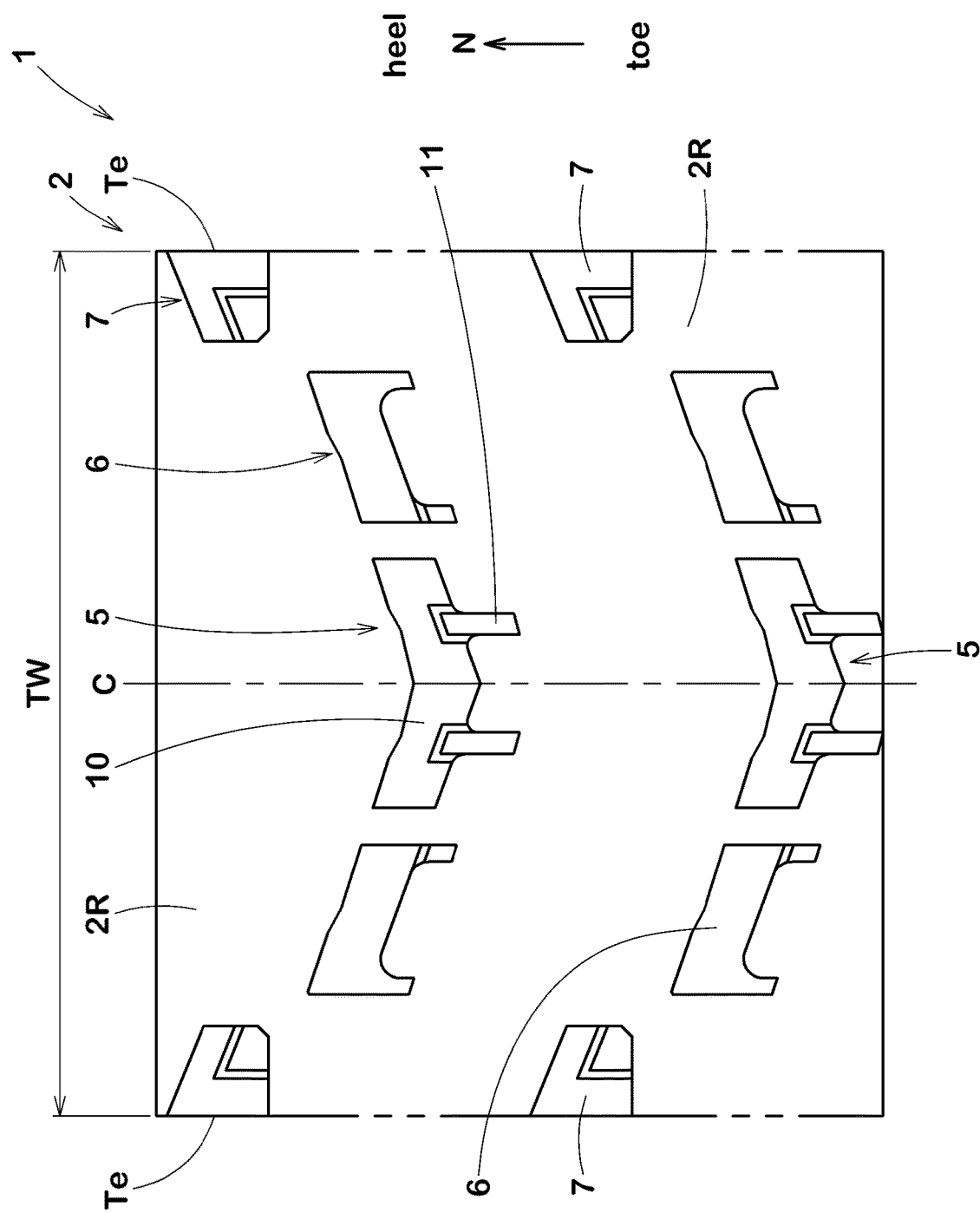
FIG. 2 is a developed plan view of a part of the tread portion of FIG. 1

The present disclosure is suitably applied to a tire for motorcycles, but may be applied to tires for passenger cars, heavy duty vehicles and the like.
Further, the present disclosure can be applied to not only pneumatic tires but also non-pneumatic tires so called airless tires.
Hereinafter, an embodiment of the present disclosure will be described in detail with reference to the accompanying drawings.
FIG. 1 is a cross-sectional partial view of a pneumatic tire 1 for running on rough terrain as an embodiment of the present disclosure.
This cross-sectional view is a tire meridian cross-sectional view including the tire rotation axis (not shown) under a normal state of the pneumatic tire 1.
FIG. 2 is a developed partial view of the tread portion 2 of the pneumatic tire 1.
In the case of a pneumatic tire, the normal state is such that the tire is mounted on a standard wheel rim and inflate to a standard pressure but loaded with no tire load. In this application including specification and claims, various dimensions, positions and the like of a pneumatic tire refer to those under the normal state of the tire unless otherwise noted.
The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.
The standard pressure is the air pressure for the tire specified by the same organization in the Air-pressure/Maximum-load Table or similar list, i.e. the "maximum air pressure" in JATMA, the "Inflation Pressure" in ETRTO, the maximum pressure given in the "Tire Load Limits at Various Cold Inflation Pressures" table in TRA or the like.
In the tire meridian cross-section of the tire 1, the radially outer surface of the tread portion 2 is curved in an arc shape which is convex toward the outside in the tire radial direction.
The tread portion 2 is provided with a directional tread pattern for which the tire rotation direction N is specified.
The tread portion 2 in the present embodiment is provided with a plurality of crown blocks 5 disposed on the tire equator C.
Each of the crown blocks 5 comprises a crown block main portion 10 and crown fin portions 11.
The crown block main portion 10 is formed in a V-shape bent convexly toward a tire circumferential direction opposite to the intended tire rotation direction N, namely, toward the toe side in the intended tire rotation direction N.
The crown fin portions 11 protrude from the crown block main portion 10 toward the toe side in the intended tire rotation direction N.
In such crown block 5, the crown fin portions 11 suppress the crown block main portion 10 from collapsing toward the circumferential direction opposite to the intended tire rotation direction N, and the crown block main portion 10 exerts an essential mud digging power to improve the traction performance of the tire.

For each of the crown blocks 5, only two crown fin portions 11 are formed. Thereby, the region where mud is easily clogged, that is, the region between the crown fin portions 11 becomes one place for each crown block 5, and the clogging of mud is reduced. As a result, the crown block main portion 10 can exert its edge effect at a high level.

The tread portion 2 in this example is further provided with middle blocks 6 located axially outside the crown blocks 5, and shoulder blocks 7 located axially outside the middle blocks 6.

Figure 4:
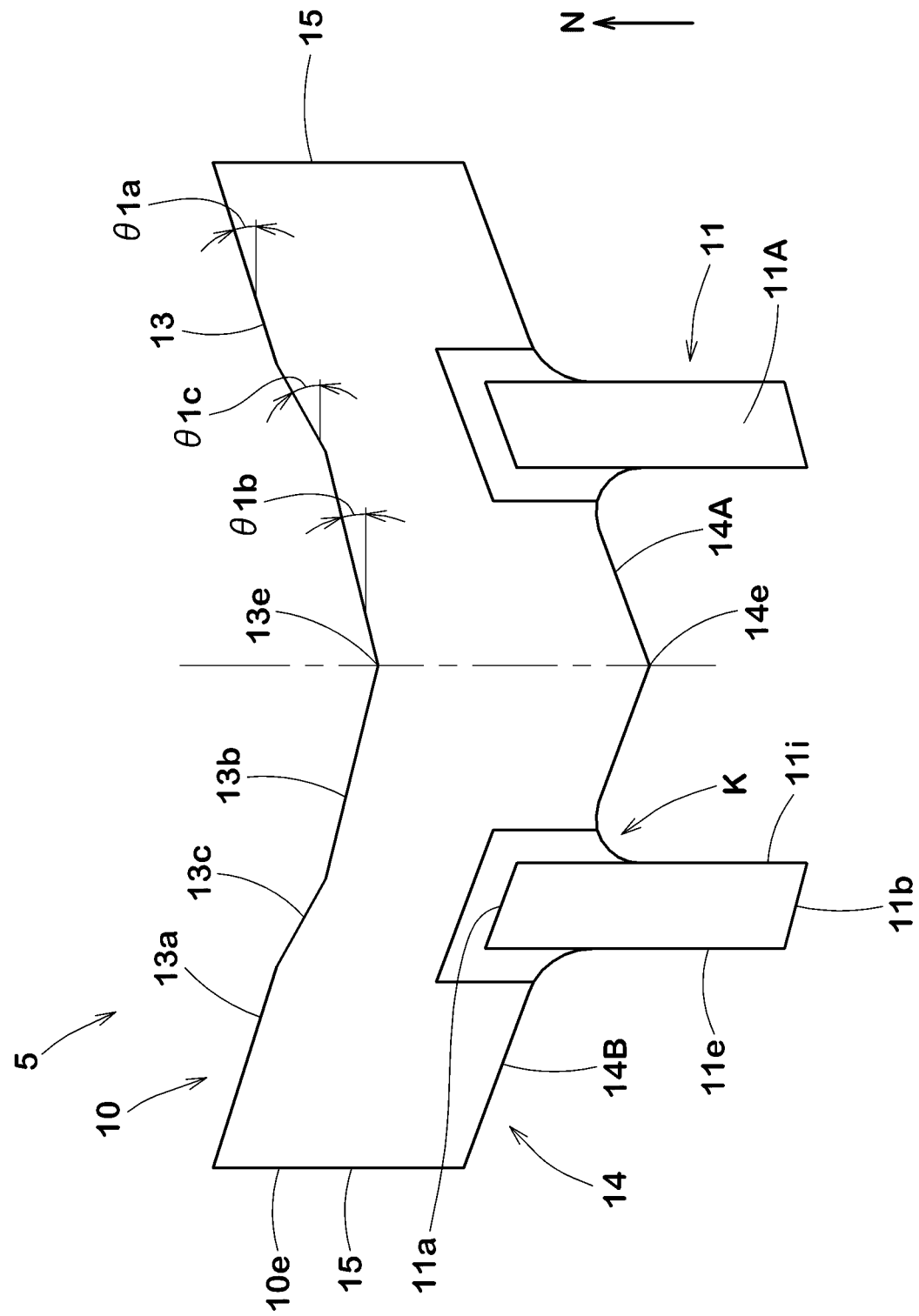

In the present embodiment, as shown in FIG. 4, on each side in the tire axial direction of each of the crown blocks 5, one middle block 6 is disposed adjacently. But, the blocks 5 to 7 are separated from each other by a tread base portion 2R.

Figure 3:
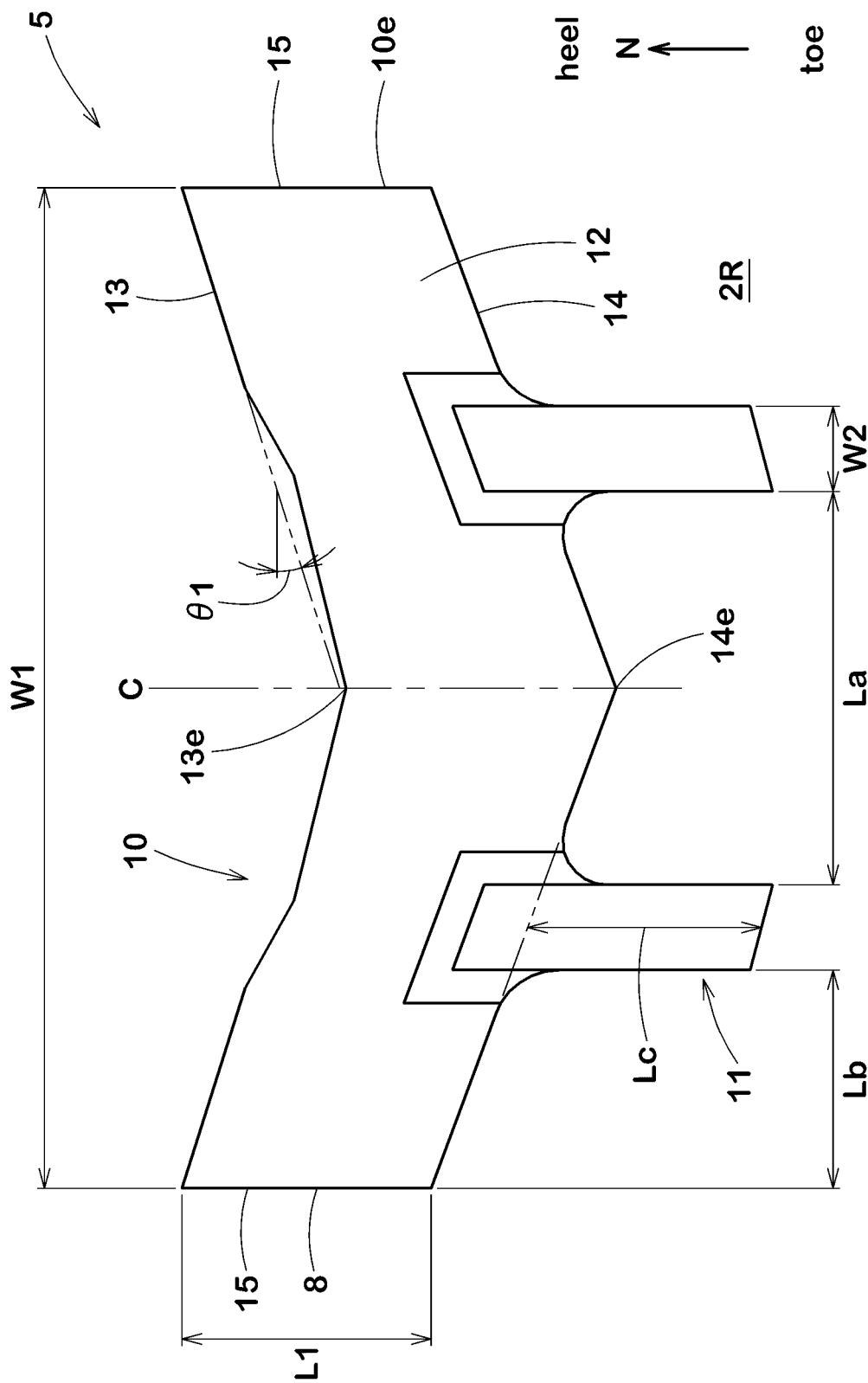
FIGS. 3, 4 and 5 shows the same top view of a crown block shown in FIG. 2 but differently provided with reference numerals.

FIG. 3 is an enlarged top view of the crown block 5.

As shown in FIG. 3, the crown block main portion 10 has
- a ground contacting top surface 12,
- a heel-side block edge 13, namely, the edge of the ground contacting top surface 12 on the heel side in the intended tire rotation direction N,
- a toe-side block edge 14, namely, the edge of the ground contacting top surface 12 on the toe side in the intended tire rotation direction N, and
- a pair of circumferential edges 15 extending in the tire circumferential direction from the axially outer ends of the heel-side block edge 13 to the axially outer ends of the toe-side block edge 14.

Further, the crown block main portion 10 has a block side wall surface 8 extending from the heel-side block edge 13, the toe-side block edge 14 and the circumferential edges 15 to the above-mentioned tread base portion 2R.

Each of the circumferential edges 15 in this example extends straight and substantially parallel to the tire circumferential direction.

Here, the expression "substantially parallel to the tire circumferential direction" means that the inclination angle with respect to the tire circumferential direction is in a range from 0 to 10 degrees.

In the present embodiment, each of the heel-side block edge 13 and the toe-side block edge 14 is inclined to the heel side in the intended tire rotation direction N toward both outer sides in a block width direction in parallel to the tire axial direction from the center in the block width direction. The heel-side block edge 13 has the toe-side end 13e positioned on the most toe-side in the intended tire rotation direction N.

The toe-side block edge 14 has the toe-side end 14e positioned on the most toe-side in the intended tire rotation direction N.

The toe-side ends 13e and 14e in the present embodiment are located on the tire equator C.

The angle θ1 of the heel-side block edge 13 is preferably not less than 10 degrees, more preferably not less than 15 degrees, but preferably not more than 45 degrees, more preferably not more than 35 degrees with respect to the tire axial direction. Here, the angle θ1 is that of a straight line drawn between the toe-side end 13e and the intersecting point between the heel-side block edge 13 and one of the circumferential edges 15.

As shown in FIG. 4, the heel-side block edge 13 is inclined with respect to the tire axial direction continuously from each circumferential edge 15 to the toe-side end 13e to the same direction toward the toe side in the intended tire rotation direction N.

The heel-side block edge 13 comprises
- two first outer portions 13a extending from the respective circumferential edges 15,
- a first inner portion 13b including the toe-side end 13e, and
- two first intermediate portions 13c connecting between the first inner portion 13b and the two first outer portion 13a.

The first intermediate portions 13c are inclined at a larger angle with respect to the tire axial direction than the first outer portions 13a and the first inner portion 13b.

In the present embodiment, each of the first outer portions 13a and the first intermediate portions 13c extends in a straight line, and
the first inner portion 13b extends in a V shape.

The difference (θ1c−θ1a) between the angle θ1a of the first outer portion 13a and the angle θ1c of the first intermediate portion 13c, each with respect to the tire axial direction, is preferably not less than 10 degrees, more preferably not less than 15 degrees, but preferably not more than 35 degrees, more preferably not more than 30 degrees.

The difference (θ1c−θ1b) between the angle θ1b of the first inner portion 13b and the angle θ1c of the first intermediate portion 13c, each with respect to the tire axial direction, is preferably not less than 10 degrees, more preferably not less than 15 degrees, but preferably not more than 35 degrees, more preferably not more than 30 degrees.

The toe-side block edge 14 comprises an inner edge portion 14A and two outer edge portions 14B.

The inner edge portion 14A extends axially inwardly from connection portions K between the crown block main portion 10 and the two crown fin portions 11.

The two outer edge portions 14B respectively extend axially outwardly from connection portions K between the crown block main portion 10 and the two crown fin portions 11.

The inner edge portion 14A includes the toe-side end 14e.

The inner edge portion 14A extends in a V shape.

In the present embodiment, the outer edge portions 14B respectively extend to the circumferential edges 15.

In the present embodiment, each of the outer edge portions 14B extends in a straight line.

In the present embodiment, each of the two crown fin portions 11 is formed in a parallel quadrilateral shape in the top view of the block.

As shown in FIG. 4, the crown fin portions 11 in this example each have
- an outer edge 11e in the block width direction,
- an inner edge 11i in the block width direction,
- a heel-side edge 11a on the heel side in the intended tire rotation direction N, and
- a toe-side edge 11b on the toe side in the intended tire rotation direction N.

The outer edge 11e and the inner edge 11i in this example extend in parallel with the tire circumferential direction.

The first edge 11a and the second edge 11b in this example extend in parallel with the adjacent outer edge portion 14B. The inner edge 11i, the outer edge 11e, the heel-side edge 11a and the toe-side edge 11b define the radially outer surface 11A of the crown fin portion 11.

Figure 6:
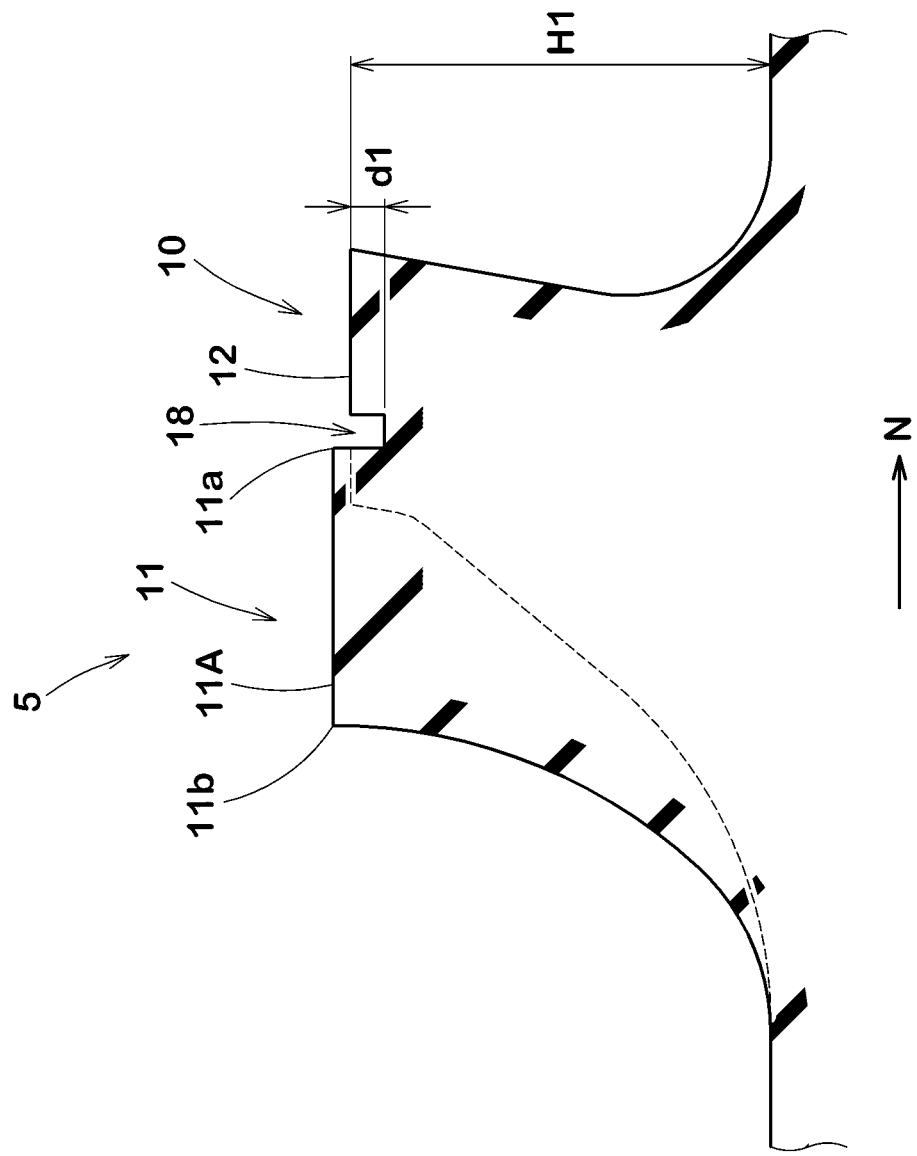
FIG. 6 is a cross-sectional view taken along line A-A of FIG. 5.

As shown in FIG. 6, in the present embodiment, the radially outer surface 11A is located radially outside the ground contacting top surface 12 of the crown block main portion 10. However, the radially outer surface 11A may be located at the same radial position as the ground contacting top surface 12 of the crown block main portion 10.

The outer edges 11e of the two crown fin portions 11 are located inside in the block width direction than the both ends 10e in the tire axial direction of the crown block main portion 10. As a result, the deformation of the crown fin portions 11 is ensured, and the effect of ejecting mud is enhanced.

The distance La in the tire axial direction between the two crown fin portions 11 is preferably set in a range of not less than 30%, more preferably not less than 35%, but not more than 50%, more preferably not more than 45% of the width W1 in the tire axial direction of the crown block main portion 10 as shown in FIG. 3.

Since the distance La is not less than 30% of the width W1, mud ejection becomes smooth. Since the distance La is not more than 50% of the width W1, the collapse of the crown block main portion 10 can be effectively suppressed.

The distance Lb in the tire axial direction between the outer edge 11e of each crown fin portion 11 and the adjacent axial end 10e of the crown block main portion 10 is preferably not less than 15%, more preferably not less than 20%, but preferably not more than 35%, more preferably not more than 30% of the width W1 in the tire axial direction of the crown block main portion 10. As a result, the deformation of the crown fin portions 11 is ensured, and the effect of ejecting mud is enhanced.

The width W2 in the tire axial direction of each crown fin portion 11 is preferably not less than 5%, more preferably not less than 10%, but preferably not more than 20%, more preferably not more than 15% of the width W1 in the tire axial direction of the crown block main portion 10.

Since the width W2 is not less than 5% of the width W1, it is possible to effectively suppress the collapse of the crown block main portion 10.

Since the width W2 is not more than 20% of the width W1, excessive increase in the rigidity of the crown fin portion 11 is suppressed, and the effect of ejecting mud is maintained.

In order to prevent the crown block main portion 10 from collapsing, the protruding length Lc (shown in FIG. 3) in the tire circumferential direction of each crown fin portion 11 from the crown block main portion 10 is preferably not less than 50%, more preferably not less than 60% of the length L1 (shown in FIG. 3) in the tire circumferential direction of the crown block main portion 10.

However, if the protruding length Lc is excessively large, the effect of ejecting mud may deteriorate, therefore, the protruding length Lc is preferably not more than 150%, more preferably not more than 110% of the length L1.

Figure 5:
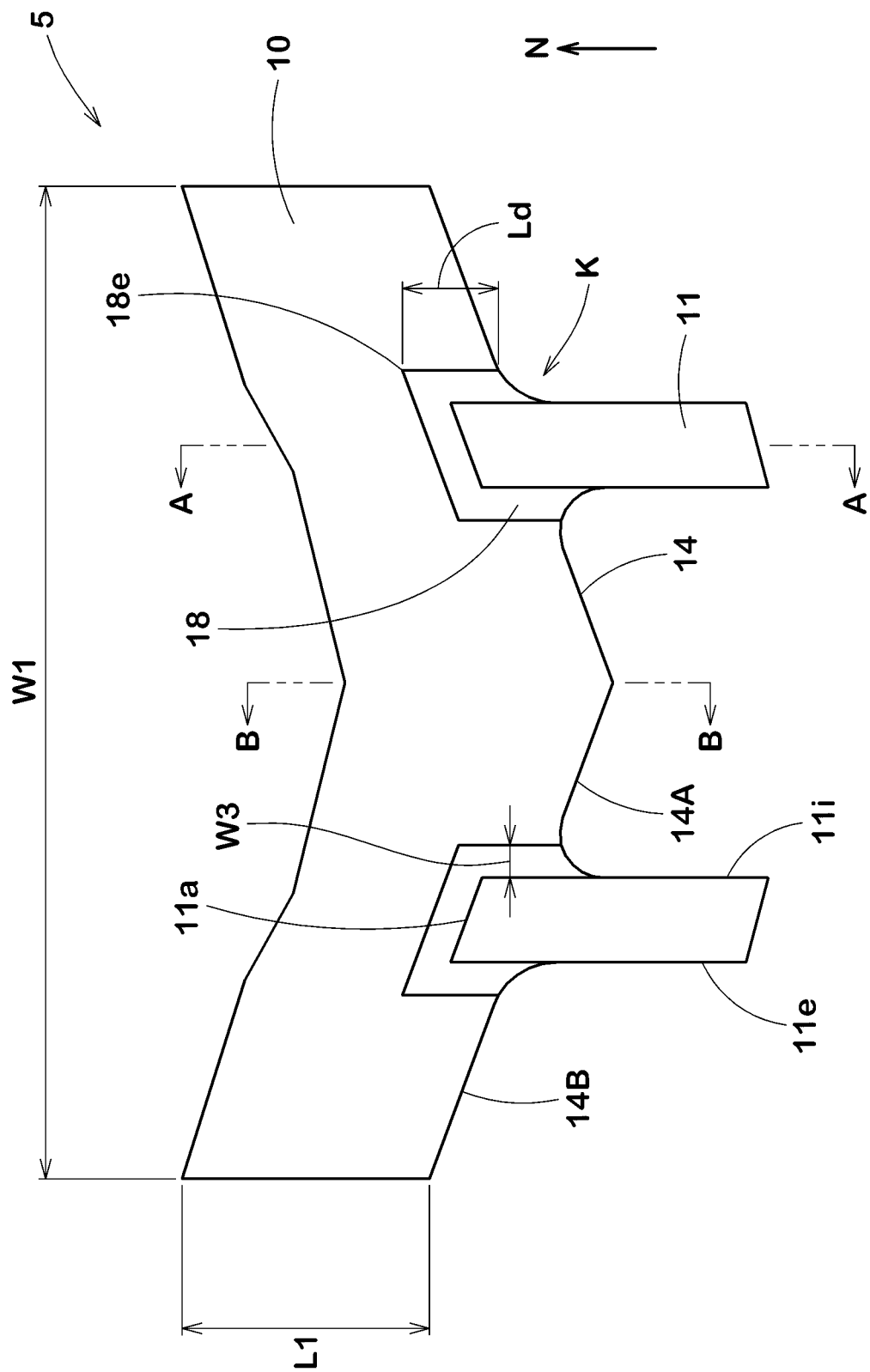

As shown in FIG. 5, the connection portion K between the crown block main portion 10 and each crown fin portion 11 is provided with a shallow groove 18 for promoting deformation of a part of the crown fin portion 11 on the connection portion K side. Thus, such shallow grooves 18 help to smoothly eject the mud clogged between the crown fin portions 11.

The shallow groove 18 extends from the inner edge portion 14A to the outer edge portion 14B so as to surround the above-said part of the crown fin portion 11 on the connection portion K side.

The shallow groove 18 extends along a part of the outer edge 11e, the heel-side edge 11a, and a part of the inner edge 11i. Thus, the shallow groove 18 extends in a U shape convex toward the heel side in the intended tire rotation direction N. The shallow groove 18 allows the crown fin portion 11 to deform as if independent from the crown block main portion 10, therefore, the traction performance on rough terrain is further improved.

FIG. 6 is a cross-sectional view taken along line A-A of FIG. 5.

As shown in FIG. 6, the groove depth d1 of the shallow groove 18 from the ground contacting top surface 12 of the crown block main portion 10 is preferably not less than 5%, more preferably not less than 10%, but preferably not more than 25%, more preferably not more than 20% of the radial height H1 of the crown block 5 from the tread base portion 2R to the ground contacting top surface 12.

Further, as shown in FIG. 5, the width W3 of the shallow groove 18 is preferably not less than 2%, more preferably not less than 5%, but preferably not more than 15%, more preferably not more than 10% of the width W1 in the tire axial direction of the crown block main portion 10.

As a result, the above-mentioned action is effectively exhibited, and the crown fin portions 11 and the crown block main portion 10 secure rigidity and generate a larger shearing force against mud and soil.

It is preferable that the distance Ld measured parallel to the tire circumferential direction from the heel-side end 18e of the shallow groove 18 to the toe-side block edge 14 is not more than 60% of the length L1 in the tire circumferential direction of the crown block main portion 10.

Thereby, the rigidity in the tire circumferential direction of the crown block main portion 10 is maintained.

As a result, the effect of suppressing the collapse of the crown block 5 when contacting with the ground is highly exhibited.

The width W1 in the tire axial direction of the crown block main portion 10 is preferably not less than 20%, more preferably not less than 25%, but preferably not more than 40%, more preferably not more than 35% of the developed tread width TW. As shown in FIG. 2, the developed tread width TW is the distance measured in the tire axial direction between the tread edges Te when the tread portion 2 is unfolded flat.

Figure 7:
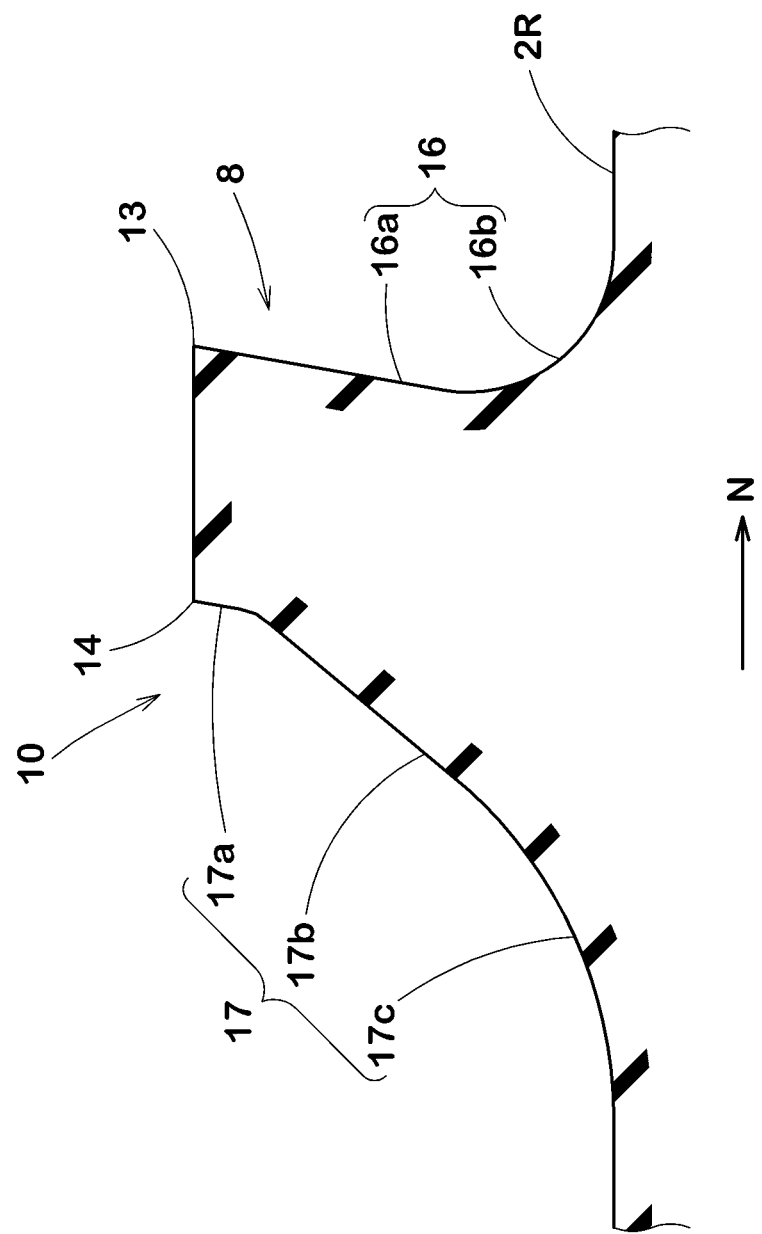
FIG. 7 is a cross-sectional view taken along line B-B of FIG. 5.

FIG. 7 is a cross-sectional view taken along line B-B of FIG. 5.

As shown in FIG. 7, the block side wall surface 8 of the crown block main portion 10 includes
a first side wall surface 16 extending radially inwardly from the heel-side block edge 13, and
a second side wall surface 17 extending radially inwardly from the toe-side block edge 14.

The first side wall surface 16 comprises a radially outer portion 16a and a radially inner portion 16b.

In the cross-sectional view, the radially outer portion 16a extends substantially straight, radially inwardly from the heel-side block edge 13, while inclining toward the toe side in the intended tire rotation direction N with respect to a straight line drawn normally to the ground contacting top surface 12 from the heel-side block edge 13.

Here, the expression "extend substantially straight" means to extend parallel to not only a perfect straight line having an infinite radius of curvature but also an arc line having a radius of curvature of at least 200 mm.

The radially inner portion 16b extends from the radially outer portion 16a to the tread base portion 2R while curving in an arc shape in the cross-sectional view. Such first side wall surface 16 can deeply dig into mud or soft ground.

The radially inner portion 16b is formed with a single radius of curvature in the present embodiment.

Such radially inner portion 16b relaxes the stress concentration acting on the radially inner portion 16b, and further improve the traction performance. However, the radially inner portion 16b may be formed by a multi-radius curve.

The second side wall surface 17 in the present embodiment comprises a first portion 17a, a second portion 17b, and a third portion 17c.

The first portion 17a extends radially inwardly from the toe-side block edge 14.

The second portion 17b extends radially inwardly from the first portion 17a and is inclined more gently than the first portion 17a.

The third portion 17c extends radially inwardly from the second portion 17b to the tread base portion 2R.

In the present embodiment, each of the first portion 17a and the second portion 17b extends linearly in the cross-sectional view. And the third portion 17c is curved in an arc shape.

For example, the third portion 17c is formed in an arc shape concave toward the heel side in the intended tire rotation direction N.

Figure 8:
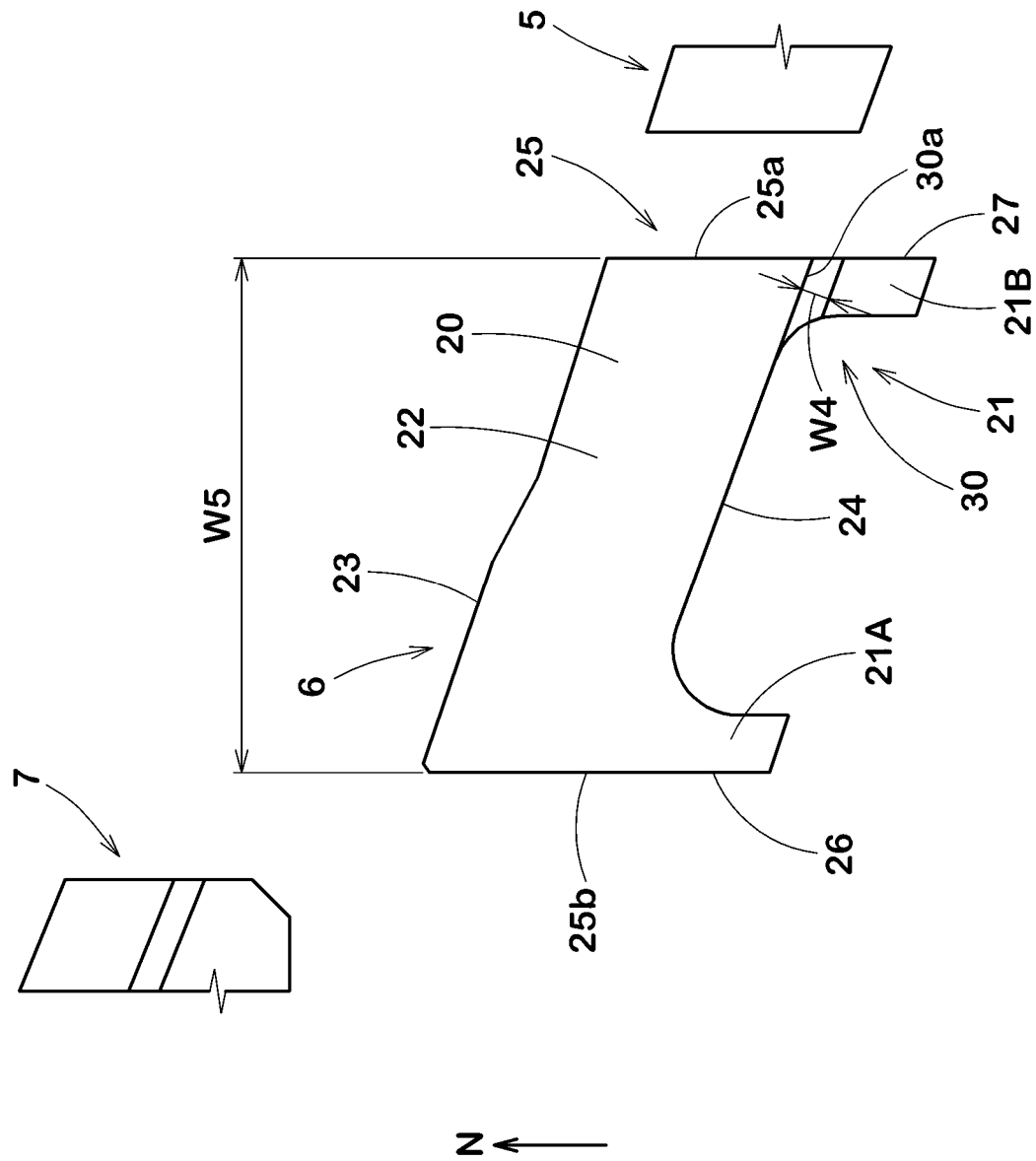
FIG. 8 is a top view of a middle block shown in FIG. 2.

FIG. 8 shows the vicinity of the middle block 6.

As shown in FIG. 8, each middle block 6 is inclined to the heel side in the intended tire rotation direction N, while extending from the inside to the outside in the tire axial direction, and comprises a middle block main portion 20 having a parallelogram shape, and a middle fin portion 21 protruding toward the toe side in the intended tire rotation direction N from the middle block main portion 20.

The middle block main portion 20 has a ground contacting top surface 22, a heel-side middle edge 23, a toe-side middle edge 24, and a pair of circumferential middle edges 25 extending from both ends of the heel-side middle edge 23, respectively, toward the toe side in the intended tire rotation direction N.

The pair of circumferential middle edges 25 is an axially inner circumferential middle edge 25a adjacent one of the crown blocks 5, and an axially outer circumferential middle edge 25b adjacent to one of the shoulder blocks 7.

The circumferential middle edges 25 in this example extend linearly.

In the present embodiment, the middle block main portion 20 is provided with the two middle fin portions 21. The two middle fin portions 21 are an axially outer middle fin portion 21A connected to the axially outer circumferential middle edge 25b, and an axially inner middle fin portion 21B located axially inside the axially outer middle fin portion 21A.

The axially outer middle fin portion 21A is directly connected to the middle block main portion 20.

The axially outer edge 26 of the axially outer middle fin portion 21A and the axially outer circumferential middle edge 25b are formed by a single straight line.

The axially inner middle fin portion 21B is connected to the middle block main portion 20, and along the junction between them, a middle shallow groove 30 is formed. The axially inner edge 27 of the axially inner middle fin portion 21B and the axially inner circumferential middle edge 25a extend in line across the middle shallow groove 30. Since the deformation of the axially inner middle fin portion 21B is promoted by the middle shallow groove 30, the mud clogged between the middle fin portions 21 can be smoothly ejected.

The middle shallow groove 30's edge 30a positioned on the heel side in the intended tire rotation direction N and extending in the longitudinal direction forms the above-mentioned toe-side middle edge 24 in this example.

The groove width W4 of the middle shallow groove 30 is preferably not less than 80%, more preferably not less than 90%, but preferably not more than 125%, more preferably not more than 110% of the groove width W3 (FIG. 5) of the shallow groove 18 of the crown block 5.

The groove depth of the middle shallow groove 30 (not shown) is preferably not less than 5%, more preferably not less than 10%, but preferably not more than 20%, more preferably not more than 15% of the block height of the middle block main portion 20 measured from the ground contacting top surface to the tread base portion 2R.

The axial width W5 (FIG. 8) of the middle block main portion 20 is preferably not less than 5%, more preferably not less than 10%, but preferably not more than 25%, more preferably not more than 20% of the developed tread width TW.

Figure 9:
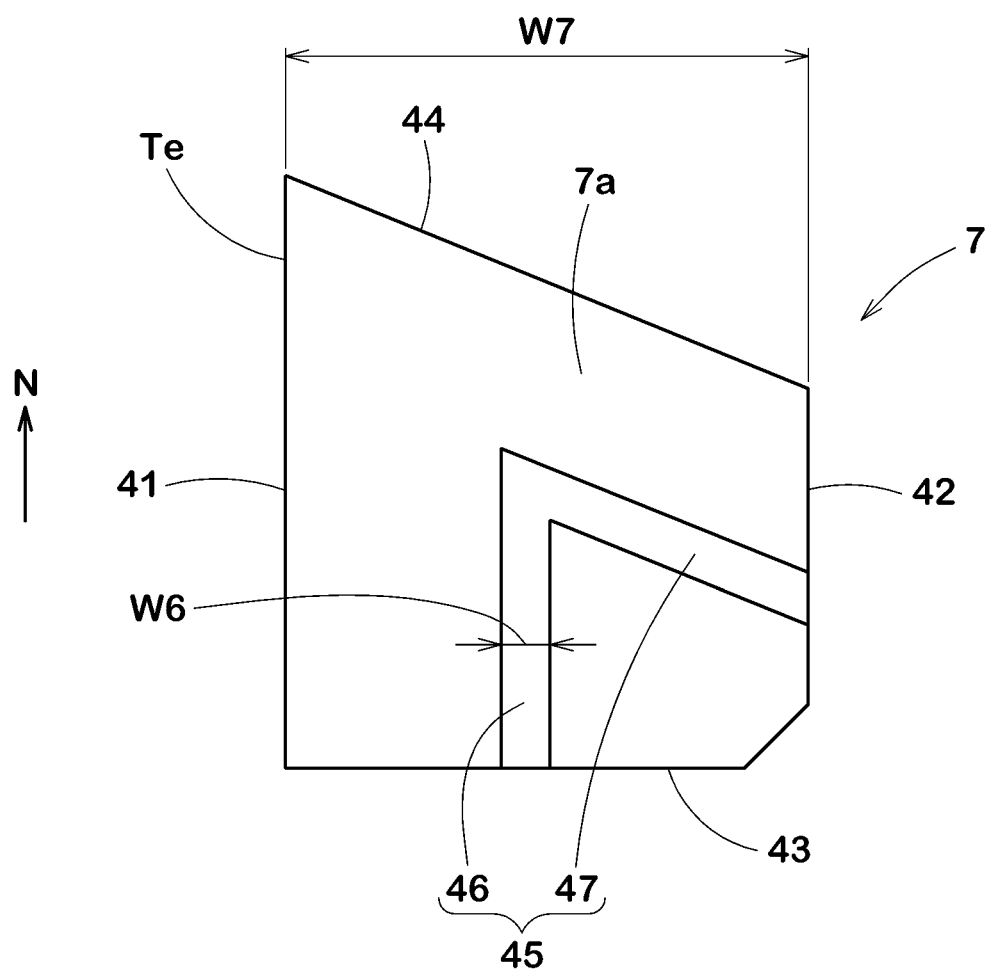
FIG. 9 is a top view of a shoulder block shown in FIG. 2.

FIG. 9 is a top view of one of the shoulder blocks 7.

As shown, the shoulder block 7 in this example is formed in a generally quadrilateral shape, more specifically trapezoidal shape in its top view.

The ground contacting top surface 7a of the shoulder block 7 has an axially outer edge 41, an axially inner edge 42, a toe-side edge 43, and a heel-side edge 44.

The axially outer edge 41 extends in the tire circumferential direction, and in this example, forms a part of the tread edge Te.

The axially inner edge 42 extends in the tire circumferential direction in this example.

The toe-side edge 43 extends in parallel with the tire axial direction from the axially outer edge 41 toward the axially inner edge 42 in this example.

The heel-side edge 44 extends from the axially inner edge 42 to the axially outer edge 41 while inclining with respect to the tire axial direction, for example, toward the intended tire rotation direction N in this example.

Each of the shoulder blocks 7 is provided with a shoulder shallow groove 45 in this example.

As shown in FIG. 9, the shoulder shallow groove 45 extends in a V shape in the top view of the shoulder block 7.

Such shoulder shallow groove 45 promotes the deformation of the shoulder block 7, and helps to eject the mud clogged between the shoulder block 7 and the adjacent middle block 6.

The shoulder shallow groove 45 is composed of a circumferential portion 46 extending in the tire circumferential direction, and an axial portion 47 extending in the tire axial direction.

The circumferential portion 46 extends at an angle of not more than 45 degrees with respect to the tire circumferential direction.

The axial portion 47 extends at an angle of more than 45 degrees with respect to the tire circumferential direction.

In this example, the circumferential portion 46 extends in parallel with the tire circumferential direction from the toe-side edge 43 toward the heel side in the intended tire rotation direction N, and ends within the shoulder block 7. In this example, the axial portion 47 extends from the axially inner edge 42 toward the outside in the tire axial direction, and is connected to the end of the circumferential portion 46. The axial portion 47 extends in parallel with the heel-side edge 44.

Such shoulder shallow groove 45 further promotes deformation of the shoulder block 7.

The groove width W6 of the shoulder shallow groove 45 is preferably not less than 5%, more preferably not less than 10%, but preferably not more than 25%, more preferably not more than 20% of the axial width W7 (FIG. 9) of the shoulder block 7. The groove depth of the shoulder shallow groove 45 is preferably not less than 5%, more preferably not less than 10%, but preferably not more than 20%, more preferably not more than 15% of the block height of the shoulder block 7 measured from the ground contacting top surface to the tread base portion 2R.

The axial width W7 of the shoulder block 7 is preferably not less than 5%, more preferably not less than 7%, but preferably not more than 20%, more preferably not more than 15% of the developed tread width TW.

It is preferable that the tread rubber 2G (FIG. 1) by which the above-mentioned blocks 5 to 7 are formed has a rubber hardness of not less than 70 degrees, and not more than 90 degrees.

Here, the rubber hardness means the durometer A hardness measured at a temperature of 23 degrees C. according to the Japanese Industrial Standard (JIS) K6253.

While detailed description has been made of a preferable embodiment of the present disclosure, the present disclosure can be embodied in various forms without being limited to the illustrated embodiment.

Comparison Tests

Based on the tread pattern shown in FIG. 2, pneumatic tires for a rear wheel of a motorcycle for running on rough terrain were experimentally manufactured as test tires (Working example tires Ex.1-Ex.6 and Comprehensive example tire Ref.1).

Specifications of the test tires are shown in Table 1.

The test tires were tested for the traction performance, braking performance and overall performance, using a 450 cc motorcycle for motocross competition having the following rim sizes and tire sizes.

front wheel rim size: 21×1.60
rear wheel rim size: 19×2.15
front tire size: 80/100-21
rear tire size: 120/80-19

In the test, the rear tire was changed, but the front tire was not changed and an identical tire was used. (tire pressure: 80 kPa)

The test method was as follows.

<Traction Performance/Brake Performance/Overall Performance>

The traction performance, brake performance and overall performance when the above-mentioned motorcycle was run on rough terrain covered with mud were evaluated by the test rider.

Here, the "traction performance" is an evaluation of the traction force at the time of accelerating during straight running and cornering, made by the test rider.

The "brake performance" is an evaluation of the braking force at the time of braking during straight running and cornering, made by the test rider.

The "overall performance" is an evaluation of the running stability at the time of accelerating and braking during straight running and cornering, made by the test rider.

The test rider evaluated each performance on a ten-point scale, and the results are shown in Table 1.

TABLE 1

| Tire | Ref. 1 | Ex. 1 | Ex. 2 | Ex. 3 | Ex. 4 | Ex. 5 | Ex. 6 |
|---|---|---|---|---|---|---|---|
| number of crown fin portions per block | 3 | 2 | 2 | 2 | 2 | 2 | 2 |
| angle θ1 (deg.) | 15.7 | 17.4 | 17.4 | 17.4 | 17.4 | 17.4 | 17.4 |
| La/W1 (%) | 30 | 20 | 38 | 38 | 38 | 50 | 45 |
| W2/W1 (%) | 12 | 8 | 8 | 8 | 8 | 8 | 8 |
| Lc/L1 (%) | 130 | 96 | 96 | 96 | 96 | 96 | 96 |
| (P)resence/(A)bsence of shallow groove | A | P | A | P | P | P | P |
| d1/H1 (%) | — | 10 | — | 10 | 10 | 10 | 10 |
| W3/W1 (%) | — | 3 | — | 3 | 3 | 3 | 3 |

TABLE 1-continued

| Tire | Ref. 1 | Ex. 1 | Ex. 2 | Ex. 3 | Ex. 4 | Ex. 5 | Ex. 6 |
|---|---|---|---|---|---|---|---|
| Ld/L1 (%) | — | 38 | — | 38 | 38 | 38 | 38 |
| tread rubber hardness (deg.) | 70 | 70 | 70 | 70 | 80 | 70 | 70 |
| traction performance | 4.5 | 6.5 | 6 | 6.5 | 7 | 6 | 6.5 |
| brake performance | 4.5 | 6 | 6 | 6.5 | 7 | 6 | 6 |
| overall performance | 4.5 | 6.5 | 6 | 6.5 | 7 | 6 | 6.5 |

From the test results, it was confirmed that the traction performance and braking performance on rough terrain of the working example tires were improved as compared with the comparative example tire.

STATEMENT OF THE PRESENT DISCLOSURE

The present disclosure is as follows:—

Disclosure 1: A tire for running on rough terrain for which an intended tire rotational direction is specified, and which comprises a tread portion provided with crown blocks disposed on the tire equator, wherein each of the crown blocks comprises a V-shaped crown block main portion which bends convexly toward a circumferential direction opposite to the intended tire rotation direction, and only two crown fin portions projecting from the crown block main portion toward the above-said circumferential direction opposite to the intended tire rotation direction.

Disclosure 2: The tire for running on rough terrain according to Disclosure 1, wherein each of said only two crown fin portions has an outer edge in a block width direction which is located inside in the block width direction than both axial ends of the crown block main portion.

Disclosure 3: The tire for running on rough terrain according to Disclosure 1 or 2, wherein the distance in the tire axial direction between said only two crown fin portions is in a range from 30% to 50% of the width in the tire axial direction of the crown block main portion.

Disclosure 4: The tire for running on rough terrain according to Disclosure 1, 2 or 3, wherein the width in the tire axial direction of each of said only two crown fin portions is in a range from 5% to 20% of the width in the tire axial direction of the crown block main portion.

Disclosure 5: The tire for running on rough terrain according to Disclosure 1, 2, 3 or 4, wherein the protruding length of each of said only two crown fin portions measured in the tire circumferential direction from the crown block main portion is not less than 50% of the length in the tire circumferential direction of the crown block main portion Disclosure 6: The tire for running on rough terrain according to Disclosure 1, 2, 3, 4 or 5, wherein a connection portion K between the crown block main portion and each of the crown fin portions is provided with a shallow groove for promoting deformation of a part of the crown fin portion on the connection portion side.

Disclosure 7: The tire for running on rough terrain according to Disclosure 6, wherein
the crown block main portion has a ground contacting top surface and a toe-side block edge,
the toe-side block edge comprises
an inner edge portion extending inward in the tire axial direction from the connection portion, and
an outer edge portion extending outward in the tire axial direction from the connection portion, and
the shallow groove extends from the inner edge portion to the outer edge portion so as to surround said part of the crown fin portion on the connection portion side.

Disclosure 8: The tire for running on rough terrain according to Disclosure 6 or 7, wherein
the depth of the shallow groove is in a range from 5% to 25% of the radial height of the crown block main portion.

Disclosure 9: The tire for running on rough terrain according to any one of Disclosures 6 to 8, wherein
the width of the shallow groove is in a range from 2% to 15% of the width in the tire axial direction of the crown block main portion.

Disclosure 10: The tire for running on rough terrain according to any one of Disclosures 6 to 9, wherein
the crown block main portion has a ground contacting top surface and a toe-side block edge, and
the distance in the tire circumferential direction between the toe-side block edge and a heel-side end of the shallow groove is not more than 60% of the length in the tire circumferential direction of the crown block main portion.

Disclosure 11: The tire for running on rough terrain according to any one of Disclosures 1 to 10, wherein
the crown block main portion has a heel-side block edge, and
the angle of the heel-side block edge with respect to the tire axial direction is in a range from 10 to 45 degrees.

DESCRIPTION OF THE REFERENCE SIGNS 1 tire for running on rough terrain
2 tread portion
5 crown block
10 crown block main portion
11 crown fin portion
N intended tire rotational direction

The invention claimed is:
1. A tire for running on rough terrain for which an intended tire rotational direction is specified, and which comprises
a tread portion provided with
crown blocks disposed on the tire equator,
shoulder blocks arranged along tread edges, and
middle blocks disposed between the crown blocks and the shoulder blocks in a tire axial direction,
wherein
each of the crown blocks comprises a crown block main portion and only two crown fin portions,
the two crown fin portions respectively projecting from one half and the other half of the crown block main portion toward a circumferential direction opposite to the intended tire rotational direction, the one half and the other half being respectively on one side and the other side of the tire equator, and
each of the two crown fin portions is connected to the crown block main portion via a U-shaped shallow groove surrounding an end in said circumferential direction of the crown fin portion,
wherein
each of the two crown fin portions is substantially parallelogram in its top view, and
each of the one half and the other half of the crown block main portion is substantially parallelogram in a top view of the crown block main portion,
wherein
each of the middle blocks comprises a middle block main portion and only two middle fin portions,
the two middle fin portions are an axially outer middle fin portion and an axially inner middle fin portion which project from the middle block main portion toward said circumferential direction opposite to the intended tire rotational direction,
the axially outer middle fin portion is directly connected to the middle block main portion, whereas the axially inner middle fin portion is connected to the middle block main portion via a straight middle shallow groove,
wherein
an axially outer edge of the axially outer middle fin portion is connected to an axially outer edge of the middle block main portion in a straight line in a top view of the middle block, and
an axially inner edge of the axially inner middle fin portion and an axially inner edge of the middle block main portion extend in a straight line through said straight middle shallow groove in the top view of the middle block, wherein
each of the shoulder blocks is provided with a V-shaped shallow groove,
the V-shaped shallow groove consists of a circumferential portion and an axial portion,
the circumferential portion extends from a toe-side edge of the shoulder block toward a heel side in the intended tire rotational direction and terminates within the shoulder block, and
the axial portion extends axially outwardly from an axially inner edge of the shoulder block to the terminal end of the circumferential portion.

2. The tire for running on rough terrain according to claim 1, wherein
with respect to each of the crown blocks,
the one half of the crown block main portion and
one of the middle blocks axially outwardly adjacent to the one half are arranged such that their edges on the heel side in the intended tire rotational direction are substantially aligned, and
the other half of the crown block main portion and
one of the middle blocks axially outwardly adjacent to the other half are arranged such that their edges on the heel side in the intended tire rotational direction are substantially aligned.

3. A tire for running on rough terrain comprising:
a tread portion provided with
crown blocks disposed on the tire equator,
shoulder blocks arranged along tread edges, and
middle blocks disposed between the crown blocks and the shoulder blocks in a tire axial direction,
wherein
each of the crown blocks comprises a crown block main portion and only two crown fin portions, the two crown fin portions respectively projecting from one half and the other half of the crown block main portion toward one side in a tire circumferential direction, the one half and the other half being respectively on one side and the other side of the tire equator, and each of the two crown fin portions is connected to the crown block main portion via a U-shaped shallow groove surrounding an end of the crown fin portion on the other side in the tire circumferential direction, wherein each of the middle blocks comprises a middle block main portion and only two middle fin portions, the two middle fin portions are an axially outer middle fin portion and an axially inner middle fin portion which project from the middle block main portion toward said one side in the tire circumferential direction, the axially outer middle fin portion is directly connected to the middle block main portion, whereas the axially inner middle fin portion is connected to the middle block main portion via a straight middle shallow groove, wherein an axially outer edge of the axially outer middle fin portion is connected to an axially outer edge of the middle block main portion in a straight line in a top view of the middle block, and an axially inner edge of the axially inner middle fin portion and an axially inner edge of the middle block main portion extend in a straight line through said straight middle shallow groove in the top view of the middle block, wherein each of the shoulder blocks is provided with a V-shaped shallow groove, the V-shaped shallow groove consists of a circumferential portion and an axial portion, the circumferential portion extends from an edge of the shoulder block on said one side in the tire circumferential direction toward said other side in the tire circumferential direction, and terminates within the shoulder block, and the axial portion extends axially outwardly from an axially inner edge of the shoulder block to the terminal end of the circumferential portion, wherein each of the crown blocks is provided with no groove other than the U-shaped shallow grooves, each of the middle blocks is provided with no groove other than the straight shallow groove, and each of the shoulder blocks is provided with no groove other than the V-shaped shallow groove.

4. The tire for running on rough terrain according to claim 3, wherein with respect to each of the crown blocks, the one half of the crown block main portion and one of the middle blocks axially outwardly adjacent to the one half are arranged such that their edges on the other side in the tire circumferential direction are substantially aligned, and the other half of the crown block main portion and one of the middle blocks axially outwardly adjacent to the other half are arranged such that their edges on the other side in the tire circumferential direction are substantially aligned.

5. A tire for running on rough terrain for which an intended tire rotational direction is specified, and which comprises a tread portion provided with crown blocks disposed on the tire equator and middle blocks disposed both outer sides in the tire axial direction of the crown blocks, wherein each of the crown blocks comprises a crown block main portion, and only two crown fin portions projecting from the crown block main portion toward a circumferential direction opposite to the intended tire rotational direction, a connection portion between the crown block main portion and each of the crown fin portions is provided with a shallow groove extending in a U shape being convex toward the intended tire rotational direction so as to surround an end portion in said circumferential direction of said each of the crown fin portions, each of the crown blocks has a heel-side block edge on a heel side in the intended tire rotational direction, and a toe-side block edge on a toe side in the intended tire rotational direction, wherein the heel-side block edge comprising a middle point in the tire axial direction, a first edge portion extending from the middle point toward one side in the tire axial direction while inclining to the heel side in the intended tire rotational direction, and a second edge portion extending from the middle point toward the other side in the tire axial direction while inclining to the heel side in the intended tire rotational direction, wherein the toe-side block edge comprising a middle point in the tire axial direction, a first edge portion extending from the middle point toward one side in the tire axial direction while inclining to the heel side in the intended tire rotational direction, and a second edge portion extending from the middle point toward the other side in the tire axial direction while inclining to the heel side in the intended tire rotational direction, wherein the shallow groove on the first edge portion of the toe-side block edge is made up of a heel-side groove portion extending while inclining in the same direction as the first edge portion, an axially inner groove portion extending toward the toe side in the intended tire rotational direction from an axially inner end of the heel-side groove portion, and an axially outer groove portion extending toward the toe side in the intended tire rotational direction from an axially outer end of the heel-side groove portion, and the shallow groove on the second edge portion of the toe-side block edge is made up of a heel-side groove portion extending while inclining in the same direction as the second edge portion, an axially inner groove portion extending toward the toe side in the intended tire rotational direction from an axially inner end of the heel-side groove portion, and an axially outer groove portion extending toward the toe side in the intended tire rotational direction from an axially outer end of the heel-side groove portion, and each of the crown fin portions is substantially parallelogram in its top view, having a heel-side edge substantially parallel with the adjacent heel-side groove portion, a toe-side edge substantially parallel with the heel-side edge, an axially outer edge and an axially inner edge substantially parallel with the tire circumferential direction, wherein each of the middle blocks has a heel-side middle block edge on a heel side in the intended tire rotational direction which inclines to the heel side in the intended tire rotational direction from the axially inside toward the axially outside of the tire, and the middle blocks are disposed one on each side in the tire axial direction of each of the crown blocks such that the heel-side middle block edge of the middle block disposed on said one side in the tire axial direction of the crown block and the crown block's first edge portion extending toward said one side are arranged substantially in line, and the heel-side middle block edge of the middle block disposed on said the other side in the tire axial direction of the crown block and the crown block's second edge portion extending toward said the other side are arranged substantially in line, wherein each of the middle blocks comprises a middle block main portion, and an axially outer middle fin portion and an axially inner middle fin portion which project from the middle block main portion toward the toe side in the intended tire rotation, the axially outer middle fin portion is directly connected to the middle block main portion, the axially inner middle fin portion is connected to the middle block main portion via a straight middle shallow groove, an axially outer edge of the axially outer middle fin portion is connected to an axially outer edge of the middle block main portion in a straight line in a top view of the middle block, an axially inner edge of the axially inner middle fin portion and an axially inner edge of the middle block main portion extend in a straight line through the straight middle shallow groove in the top view of the middle block, and the straight middle shallow groove is inclined in the same direction as the heel-side middle block edge, wherein the tread portion is provided with shoulder blocks arranged along tread edges, each of the shoulder blocks is provided with a V-shaped shallow groove, the V-shaped shallow groove is composed of a circumferential portion and an axial portion, the circumferential portion extends from a toe-side edge of the shoulder block toward the heel side in the intended tire rotational direction and terminates within the shoulder block, the axial portion extends axially outwardly from an axially inner edge of the shoulder block to the terminal end of the circumferential portion, and the V-shaped shallow groove of the shoulder block has a V-shape in a top view of the shoulder block.

6. The tire for running on rough terrain according to claim 5, wherein the angle of the heel-side block edge of each of the crown blocks with respect to the tire axial direction is in a range from 10 to 45 degrees.

7. The tire for running on rough terrain according to claim 5, wherein each of the middle blocks is provided with no groove other than the straight shallow groove.

8. The tire for running on rough terrain according to claim 5, wherein each of the crown blocks is provided with no groove other than the shallow groove.

9. The tire for running on rough terrain according to claim 8, wherein each of the middle blocks is provided with no groove other than the straight shallow groove.

10. The tire for running on rough terrain according to claim 5, wherein the width in the tire axial direction of each of said only two crown fin portions is in a range from 5% to 20% of the width in the tire axial direction of the crown block main portion.

11. The tire for running on rough terrain according to claim 10, wherein the protruding length of each of said only two crown fin portions measured in the tire circumferential direction from the crown block main portion is not less than 50% of the length in the tire circumferential direction of the crown block main portion.

12. The tire for running on rough terrain according to claim 5, wherein the depth of the shallow groove is in a range from 5% to 25% of the radial height of the crown block main portion.

13. The tire for running on rough terrain according to claim 12, wherein the width of the shallow groove is in a range from 2% to 15% of the width in the tire axial direction of the crown block main portion.

14. The tire for running on rough terrain according to claim 13, wherein a distance from a heel-side end of the shallow groove to the toe-side block edge measured in the tire circumferential direction is not more than 60% of a length in the tire circumferential direction of the crown block main portion.

15. The tire for running on rough terrain according to claim 5, wherein the distance in the tire axial direction between said only two crown fin portions is in a range from 30% to 50% of the width in the tire axial direction of the crown block main portion.

16. The tire for running on rough terrain according to claim 15, wherein the protruding length of each of said only two crown fin portions measured in the tire circumferential direction from the crown block main portion is not less than 50% of the length in the tire circumferential direction of the crown block main portion.

17. The tire for running on rough terrain according to claim 15, wherein
the width in the tire axial direction of each of said only two crown fin portions is in a range from 5% to 20% of the width in the tire axial direction of the crown block main portion.

18. The tire for running on rough terrain according to claim 17, wherein
the protruding length of each of said only two crown fin portions measured in the tire circumferential direction from the crown block main portion is not less than 50% of the length in the tire circumferential direction of the crown block main portion.

* * * * *